Nov. 1, 1938.  O. C. BREWSTER  2,134,699
SEPARATION OF HYDROCARBONS
Filed Sept. 29, 1936
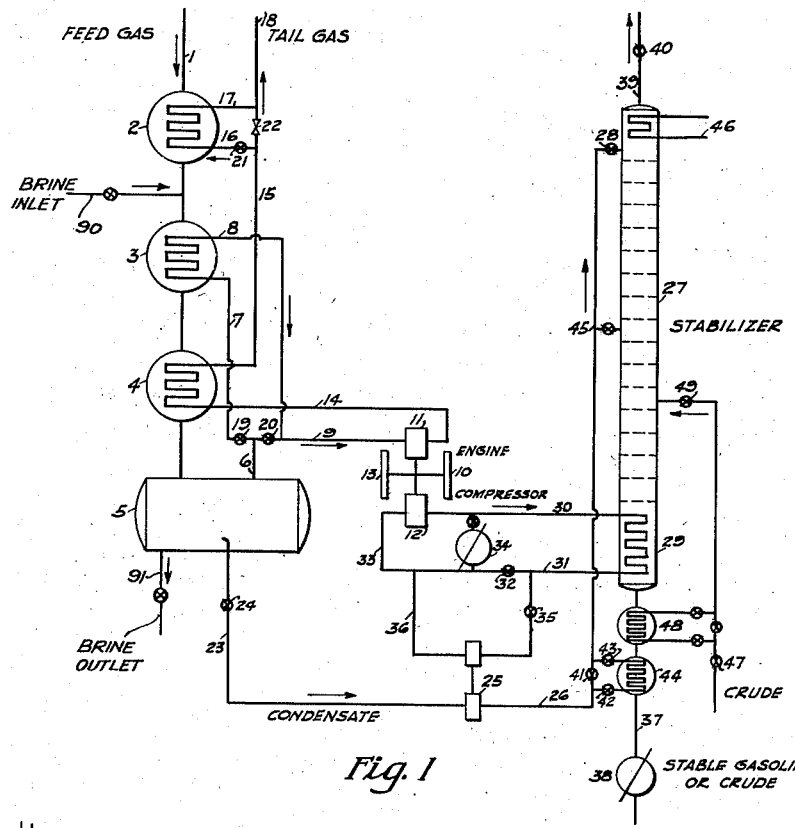
Fig. 1
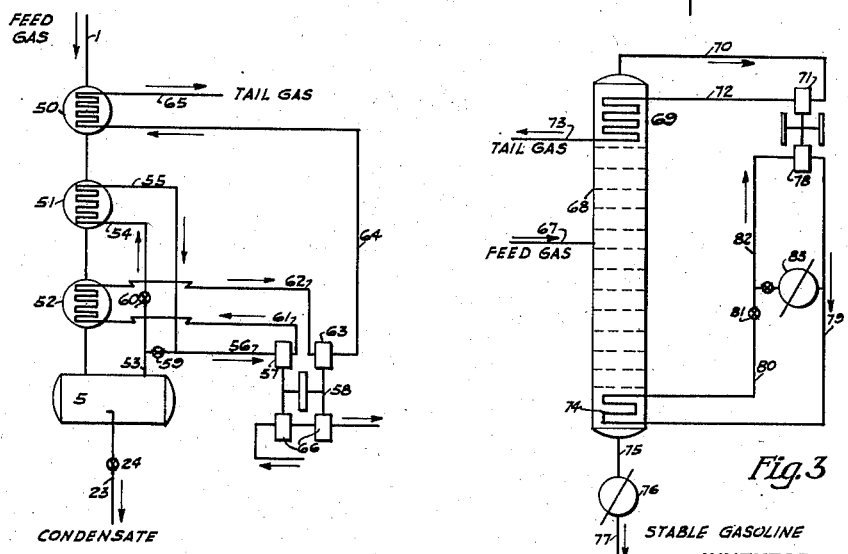
Fig. 2
Fig. 3
INVENTOR
Oswald C. Brewster
BY Kenyon & Kenyon
ATTORNEYS Patented Nov. 1, 1938

2,134,699

UNITED STATES PATENT OFFICE 2,134,699

SEPARATION OF HYDROCARBONS

Oswald C. Brewster, Litchfield, Conn., assignor to Refinery Engineers, Inc., New York, N. Y., a corporation of Missouri Application September 29, 1936, Serial No. 103,121

20 Claims. (Cl. 62—175.5)

This invention relates to the separation of liquefiable constituents from hydrocarbon gases and more particularly to a method for recovering components of natural gas falling within the motor fuel boiling range whereby the energy of the gas due to its pressure as it comes from the separator at the oil or gas well is utilized to carry out the steps of the process.

In the production of crude petroleum from wells the relatively heavy crude often has associated with it large amounts of hydrocarbon gases, consisting of methane, ethane, propane and butanes, and their corresponding homologues of the ethylene series. In order to produce the oil it is also necessary to permit the gas to flow from the well. Particularly is this so in the case of so-called "flush" production where a new oil field has been brought in and the wells are under heavy gas pressure, often ranging upwards of a thousand pounds per square inch. The common practice in producing oil from such wells is to allow the gas and crude to flow from the well, often through a pressure reducing orifice, or "choke", to a separating tank wherein the gas and oil are permitted to separate so that they may be drawn off as liquid and gaseous streams. The oil is conducted to tanks carried at atmospheric pressure where it may be gauged and from which it may be pumped into the gathering system for ultimate delivery to a refinery. The gas from the separator may pass into a line conducting it to a gasoline recovery plant, or into a fuel gas gathering system, or it may be blown to the air, usually being burned at a torch, when there is no other demand for it. Many billions of cubic feet of gas are thus burned annually. While the lighter hydrocarbon content of this gas may represent little value, there is invariably present in the gas appreciable quantities of valuable recoverable gasoline, consisting of hydrocarbons containing four, five, and six or more carbon atoms per molecule. These constituents of the gas are present in vapor form in amounts corresponding to their equilibrium partial pressures in the crude oil under the temperature and pressure conditions existing in the separator. Higher separator pressures tend to reduce the amount of heavier hydrocarbons in the gas and lower pressures tend to increase the amount. When, however, high pressures are used in the separator, substantial amounts of gas remain absorbed in the crude and this gas is released when the crude is run to the flow tanks and, since the pressure here is substantially atmospheric, the gas so released contains large quantities of the more valuable hydrocarbons. Thus the attempt is usually made so to balance the separator pressure that the total loss of valuable components is a minimum. In spite of this the losses thus suffered are commonly of considerable magnitude. The recoverable gasoline contained in the "wet" gas from the separator may amount to from one half gallon or less to several gallons per thousand cubic feet of gas and the gas released from a single well often amounts to several million cubic feet per day. In addition the amount of valuable components released from the crude at the flow tanks is of substantial proportions. While much of this lost product could be recovered by well known means it is not usually considered profitable to do so until an oil field is in more or less settled production after the gas pressure has been reduced by depletion. This is largely due to the fact that the equipment necessary to carry out the recovery process has heretofore been of an elaborate and costly character and cannot economically be installed to handle the large quantities of relatively lean gas available under flush conditions.

Moreover, with the recent advances made in the technology of gas polymerization, propane and propylene have assumed a new importance and value as feed stock for this process. In the past only a negligible effort has been made to recover these materials as well as large amounts of butanes and butylenes which are in excess, as such, for direct use as motor fuel but which may be converted, by polymerization, to high quality gasoline.

It is an object of this invention to provide a simple and economical method for recovering liquid hydrocarbons from mixtures of the vapors thereof with the vapors or gases of more volatile hydrocarbons, the method being advantageous for the recovery of hydrocarbons boiling in the motor fuel range from wet natural gas and from the gases evolved from the petroleum that is produced either with the wet natural gas or otherwise, and the method being especially advantageous in the treatment of wet gases which are under substantial pressure when produced.

In accordance with this invention expansion of a portion of the gas, with reduction of temperature thereof, is utilized to effect a cooling of the gas and a partial condensation thereof. Further features of this invention are that the wet gas is cooled to effect partial condensation thereof and the uncondensed gas is expanded with a reduction of temperature that is utilized to effect the cooling, that the work effected by the expansion of the uncondensed gas is transmitted to the condensate in the form of heat to promote stabilization thereof, that said expansion is effected by passing the gas to a zone of lower pressure, that said expansion is preferably effected by utilizing feed gas under substantial superatmospheric pressure and passing it to a zone of lower or atmospheric pressure, that said expansion is effected in an engine operating a compressor which transforms the resulting work into heat, that the condensate resulting from the cooling is stabilized by rectification wherein the cooled condensate is fed to an upper level of the stabilizer as reflux, that the heat derived from the work performed is supplied to a lower level of the stabilizing zone, that the work performed in said expansion may be utilized in circulating the condensate, that the condensate passing to the stabilizing zone may be partially heated by heat exchange with the liquid leaving said zone, that crude oil produced with, or separately from, the wet gas and containing gaseous hydrocarbons may be stabilized with the condensate to produce a stabilized crude oil containing all of the gasoline hydrocarbons and substantially freed of fixed gases, and that the cooled uncondensed and unexpanded gases of the first cooling operation may be utilized in the cooling of the wet gas fed to the system, and so, or otherwise, heated before expansion.

This invention resides in either the separate or conjoint use of the features thereof herein enumerated and is not limited to the use of all of said features at the same time. This invention is of especial advantage in avoiding loss of motor fuel constituents contained in wet gas or contained in petroleum which is under pressure and from which, upon release of pressure, gases are evolved which carry motor fuel constituents, and is of especial advantage in the separation and concentration of hydrocarbons containing three and four carbon atoms to the molecule which are of value in the synthesis of motor fuel by polymerization.

Other objects and purposes of this invention will be apparent from the following description in connection with the appended drawing, in which, Figure 1 represents diagrammatically an apparatus for practicing the invention, Figure 2 represents diagrammatically apparatus for practicing a modification of the invention, and Figure 3 represents diagrammatically apparatus for practicing another modification of the invention.

Referring to Figure 1, wet feed gas under substantial pressure enters the system through pipe 1, passes through heat exchanger 2 wherein it is in indirect heat exchange contact with cool tail gas and is cooled and a portion is condensed. From exchanger 2 the fed gas and condensed portion pass to heat exchanger 3 wherein it is cooled and condensed further and from exchanger 3 it passes to heat exchanger 4 where it is still further cooled and condensed. From exchanger 4 the cooled gas and condensed liquid pass to drum 5 in which gas and liquid separate. The dry gas from which the heavier components have been condensed passes from drum 5 through pipe 6 and branch pipe 7 to heat exchanger 3 wherein the gas cools the feed gas passing therethrough and is itself warmed. From exchanger 3 the dry gas passes by way of pipes 8 and 9 to the inlet port of engine 10. Engine 10 is shown diagrammatically as consisting of prime mover cylinder 11 directly connected to gas compressor cylinder 12 and is equipped with a fly wheel and the usual valve mechanism (not shown) and other necessary auxiliary equipment. The valve mechanism may be of any of the usual types applicable to an engine of the expansion type which is most commonly exemplified by the ordinary steam engine. The gas, on admission to the cylinder, and in expanding against the piston therein, gives up a portion of its energy thereto and in so doing suffers a marked lowering in temperature as well as pressure according to well known thermodynamic principles.

The gas, on being exhausted from the engine at low pressure and temperature passes through pipe 14 to exchanger 4 where it imparts the final cooling to the feed gas. From exchanger 4 it passes through lines 15 and 16 to exchanger 2, where it imparts the initial cooling to the feed gas. From exchanger 2, the gas, now warmed to a temperature approaching that of the feed gas, passes out of the system through pipes 17 and 18 from which it may pass to the air to be burned or from which it may pass to a disposal system where it is put to some useful purpose.

Under certain conditions it may be desirable to have the dry cold gas from drum 5 pass directly to engine 10 without passing through exchanger 3. This may be done by closing valve 19 in pipe 6 and opening valve 20 in pipe 9, thereby bypassing the gas around exchanger 3, making it ineffective. The gas, exhausting from the engine into pipe 14 at a lower temperature than under the conditions where exchanger 3 was used, passes to exchanger 4 as before. Under certain conditions the desired degree of cooling of the feed gas may be obtained in exchanger 4 alone, in which case exchanger 2 may also be bypassed by manipulation of valves 21 and 22.

Exchangers 2, 3 and 4 may be placed in any desired order in the gas circuit. The feed gas may be fed through them in parallel or partly in parallel and partly in series. The arrangement here shown is merely by way of example and any suitable arrangement is to be considered within the scope of this invention.

The condensate collected in the drum 5 is withdrawn therefrom through pipe 23, controlled by valve 24, and is charged by pump 25 through pipe 26 to the top of stabilizer column 27 through connection 28. Under certain conditions the stabilizer 27 may operate at a lower pressure than that obtaining in drum 5, in which case pump 25 may not be required. Stabilizer 27 may be of any preferred type, for example, it may be a fractionating column of the usual bubble plate type commonly used for stabilizing "wild" gasoline or it may be of the well-known "packed" type. Heat is supplied to the bottom of the stabilizer by heating coil 29. In a preferred embodiment of the invention the heating medium in coil 29 is a gas circulated therethrough by the compressor cylinder 12 of engine 10. Compressor 12 forces gas at elevated pressure and temperature through pipe 30, through heating coil 29 to pipe 31 and through throttling device 32 and pipe 33 back to the intake of compressor 12. Throttling device 32 reduces the pressure of the flowing gas and may be any suitable device, such as a valve or orifice. The mechanical energy in the form of work delivered by the compressor to the gas is converted into heat on compressing the gas and this heat is utilized in heating coil 29 to furnish the heat required by the stabilizer. Since the heat delivered by the compressor may be in excess of that required by the stabilizer, the excess heat may, for control purposes, be absorbed by gas cooler 34 through which controlled portions of the gas may be passed, the heat thereof being absorbed by means of water or other cooling medium. Other suitable control means may be employed as, for example, discharging hot gas into the tail gas system and drawing relatively cool tail gas into the system to compensate for that discharged. Pump 25 may be actuated by the gas flowing in this circuit as shown. Gas at high pressure flows from pipe 31 through valve controlled pipe 35 to the expansion cylinder of pump 25, exhausting therefrom to pipe 36 and returning to pipe 33 through which low pressure gas is returned to compressor 12. Other necessary pumps (not shown) may be similarly operated. It is apparent that that portion of the energy so delivered therethrough to the condensate in the form of work is not converted to heat in the gas circulating system described.

While the compression of a gas has been described as the preferred method whereby the mechanical energy of the engine may be transformed into heat for the purpose specified, other methods may be employed and all such methods are to be considered as falling within the scope of this invention. For example, a liquid may be pumped through a similar system, the heat in this case being largely generated as the liquid flows through the pressure reducing device. The engine may, for example, be used to drive an electric generator and the electrical energy thus generated may be converted into heat by means of suitable resistance units.

Cold condensate charged to stabilizer 27 flows downwardly therethrough in direct contact with ascending warm vapor from the bottom of the column in the well-known manner of operation of such fractionating equipment. By the time it has reached the bottom of column 27 it has been stripped of undesirable low boiling components and is discharged from the system through pipe 37 and cooler 38 to suitable storage as stabilized motor fuel. The undesirable low boiling components pass as a gas from the top of column 27 through pipe 39 controlled by valve 40 to a suitable disposal system (not shown).

As will be more fully disclosed hereinafter, under certain conditions, it may be preferred to pass the condensate in indirect heat exchange relationship with the effluent heated stabilized product, thereby warming the condensate. This may be accomplished by manipulation of valves 41, 42 and 43, causing condensate to flow through heat exchanger 44 back to line 26. The warmed condensate may be introduced into stabilizer 27 at connection 45 located at an intermediate point in tower 27. In such case, and other cases if desired, reflux for the tower above the point of introduction of the condensate may be furnished by reflux condensing coil 46 located in the top of the tower, the cooling medium therein being water or other available cooling fluid. Reflux condenser 46 may be located exterior of the tower and reflux returned by methods commonly employed therefor.

Under certain conditions it may be desired to stabilize the crude petroleum, delivering a product containing the crude and the recovered hydrocarbons mixed, the whole being stripped of undesirable low boiling components. To this end crude oil from the separator may be introduced through pipe 47, heated in heat exchanger 48, and introduced at an intermediate point 49 in stabilizer 27. In this case the product passing to storage through pipe 37 consists of crude oil, stripped of its light ends, mixed with liquefiable components recovered from the feed gas.

Figure 2 shows diagrammatically apparatus for carrying out a modified procedure for expanding the uncondensed gas and deriving cooling and heating from the expansion thereof. Therein is shown only that portion of the operating cycle related to the cooling of the feed gas and the expansion of the tail gas. Feed gas from the separator enters the system under substantial pressure through heat exchangers 50, 51 and 52 wherein it is cooled and partially condensed. The liquid and uncondensed gas flow into drum 5 where liquid and gas separate. Cold gas in drum 5 flows therefrom through pipe 53 and branch pipe 54 to heat exchanger 51 where it is warmed by feed gas passing therethrough. From exchanger 51 the warmed gas flows through pipes 55 and 56 to the high pressure stage 57 of engine 58, here shown as a two stage engine driving a compressor. By manipulation of valves 59 and 60 gas may be caused to flow directly from drum 5 through pipes 53 and 56, to engine 58, bypassing exchanger 51. The gas in expanding through high pressure stage 57 of engine 58 suffers a reduction in pressure to some value intermediate that at which it enters the system and that at which it is finally to be exhausted and in this expansion its temperature is substantially lowered. The cooled gas exhausts from stage 57 into pipe 61 and passes through heat exchanger 52, being warmed therein and cooling the feed gas passing therethrough. The warmed gas passes from exchanger 52 through pipe 62 to low pressure stage 63 of engine 58 wherein it gives up its remaining available energy in its expansion to the final exhaust pressure, and again suffers a substantial reduction in temperature. The gas at reduced temperature and pressure exhausts from low pressure stage 63 into pipe 64 through which it passes to heat exchanger 50 where it is warmed by incoming feed gas which is thereby cooled. From exchanger 50 the warmed tail gas passes through pipe 65 to the torch or other disposal system, not shown.

The condensate collected in drum 5 is withdrawn therefrom through valved pipe 23 for processing in the stabilizer as already described in connection with Figure 1. The compressor 66, driven by engine 58 operates as already described in connection with Figure 1 to furnish heat for the stabilizer.

Engine 58 has been here described as a two-stage reciprocating engine. It is apparent that any desirable number of stages may be employed with intermediate heat exchange between stages. Engine 58 may be of any desirable type and may be a turbine or other type of engine capable of converting the energy of the expanding gas into work according to well-known principles.

Figure 3 of the drawing represents diagrammatically an embodiment of the invention wherein wet gas is introduced at an intermediate point in a fractionating column, the top of which is cooled by expanded gas, and the bottom of which is heated by means of energy derived from the expanding gas.

Wet gas under substantial pressure is introduced through pipe 67 into fractionating column 68 at an intermediate point. The wet gas rises in the column contacting a descending stream of condensate, whereby the higher boiling components of the gas are absorbed by the liquid and the gas is cooled in the usual manner of operation of fractionating columns. The partially stripped and cooled gas passes in contact with cooling coil 69 which liquefies the heavier portion of the gas, thus furnishing the reflux condensate descending the tower. Stripped dry gas passes from the tower through pipe 70 to engine 71 wherein it expands and performs work and suffers a marked drop in temperature as already described. The cold expanded gas exhausts from engine 71 into pipe 72 and passes through coil 69, cooling the rising gas and in so doing being itself warmed. From coil 69 the gas passes through pipe 73 to any desired disposal system.

The reflux condensate in descending the column is warmed by rising gas and vapor and is thereby stripped of its lighter undesirable components and at the same time absorbs from the rising gas the heavier desirable components. On reaching the bottom of column 68 it is heated by heating coil 74 to the required temperature such that it will have the vapor pressure characteristics of the desired stable motor fuel product. From the bottom of column 68, the stable product passes through pipe 75 to cooler 76, and thence through pipe 77 to storage.

Heat is supplied to coil 74 in a manner similar to that described in connection with Figure 1. Engine 71 drives compressor 78 which compresses gas and discharges it at a high temperature through pipe 79 to coil 74 wherein the hot gas gives up a portion of its heat. The partially cooled gas passes from coil 74 through pipe 80 to pressure reducing device 81 and the gas, at reduced pressure, flows through pipe 82 to the intake of compressor 78 where it is recompressed and reheated. To control the amount of heat delivered to coil 74, controlled amounts of hot gas are by-passed from pipe 79 through cooling coil 83 to pipe 82.

In accordance with the invention the gas and crude oil coming from the well may be separated in the separator at any desirable pressure from as low as 35 pounds per square inch gauge or lower to as high as the well pressure at the casinghead, this pressure in some cases being over 1000 pounds per square inch. Depending on the pressure and temperature existing in the separator and on the composition of the crude and gas, the gas thus separated from the crude may contain from as little as one half gallon to several gallons per thousand cubic feet of recoverable gasoline along with considerable quantities of valuable propane and butane. This gas in passing through heat exchangers 2, 3, and 4 or 50, 51, 52 as described is cooled to such a temperature that substantially all of the recoverable gasoline is condensed to a liquid along with appreciable quantities of butanes, propane, ethane, and some methane. Depending on the nature of the gas and the pressure involved the temperature to which it must be chilled may vary from as low as 100 degrees Fahrenheit below zero or lower to 30 degrees above zero or higher. It is desirable that the pressure drop of the gas in passing through the exchangers due to friction should be as low as possible to conserve energy and for this reason the exchangers are constructed so as to offer the cooling surface required with as little frictional resistance as practical considerations permit. It is also desirable to avoid as far as possible heat losses from the system, therefore the pipes, exchangers, and so forth are heavily insulated.

The dry gas from drum 5 in expanding through the engine is reduced in temperature by an amount depending (1) on the ratio of pressure before and after expansion, (2) on the thermal efficiency of the engine, and (3) on the physical characteristics of the gas. The expansion follows the general polytropic relationship.

$$\frac{T_2}{T_1} = \left(\frac{p_2}{p_1}\right)^{\frac{n-1}{n}}$$

where $T_2$ is the absolute temperature before expansion, $T_1$ the absolute temperature after expansion, $p_2$ the absolute pressure before expansion, $p_1$ the absolute pressure after expansion, and $n$ is a function dependent on the efficiency of the engine whose value lies between unity for an isothermal expansion and the ratio of the specific heat of the gas at constant pressure to that at constant volume, this ratio being the exponent in the familiar equation ($pv^n =$ constant) for true adiabatic expansion. In actual practice the value of $n$ may vary from around 1.15 or lower to 1.3 or higher and for average hydrocarbon gases and under average operating conditions may be in the neighborhood of 1.2. Thus, depending on the expansion ratio through the engine, or each stage thereof, the temperature of the gas may be lowered under practical operating conditions by forty degrees or less or by as much as two hundred degrees or more with high expansion ratios. By this means exhaust gas from the engine is available at relatively very low temperatures ranging from around zero degrees Fahrenheit to well below one hundred degrees below zero and is available as a refrigerant for the incoming feed gas at temperatures well below the final temperature desired for the chilled feed gas. The extent to which this available refrigeration is utilized in practice is dependent upon the amount of heat exchanger surface provided and its arrangement, both factors being readily determined by one skilled in the art of heat interchange.

As will be apparent to those conversant with the art of fractional condensation, in order to secure the condensation of substantially all of the desired high boiling components of the feed gas it is necessary to condense also substantial quantities of the lighter components, undesirable as constituents of the final product. Thus the condensate collected in drum 5 is a "wild" product, that is, it contains components of a lower boiling point than can be tolerated in a commercial motor fuel according to modern usage. These components are an excess of the butanes, of which only a limited proportion is desirable, along with propane, ethane, and methane, the presence of which in any proportion is undesirable. In order to remove these objectionable constituents the condensate is stabilized in stabilizer 27 as already described and in accordance with common practice. When the cold condensate is introduced into the top of column 27 at connection 28 the action is largely one of stripping. When the condensate is introduced at an intermediate point in the column, as at connection 45, and reflux is furnished to the top of the column by coil 46, a rectifying operation is involved which results in a somewhat more nearly complete separation of the components of the condensate. The pressure and temperature conditions existing in the stabilizer are subject to wide variation. When the column is operated as a stripping column only, the pressure may vary from substantially atmospheric pressure to as high as three or four hundred pounds per square inch or higher. The temperature maintained at the bottom of the stabilizer must be such that the vapor pressure of the stabilized product is of the desired value. Thus the desired product may be required to have a "Reid vapor pressure" of ten pounds or less or it may be desired to produce as high as "twenty-six pound Reid" gasoline. In the first case the temperature for a given tower pressure would obviously be higher than when making the more volatile high vapor pressure product. In general, for a fixed temperature of feed of condensate at the top of the column, higher pressure, and hence higher bottom temperature for a given quality of product, results in greater fractionating effect in the tower. Also when the reflux condenser coil 46 is used the tower must be operated at such pressure that the tower top temperature will be high enough to permit the available cooling medium, such as water, to cause condensation of reflux. From this it is evident that the temperatures maintained in the tower are dependent on the pressures used, the product desired, and the method of operation, and may vary from around 100 degrees Fahrenheit or lower at the bottom to as high as 300 degrees Fahrenheit to 400 degrees Fahrenheit or higher.

It will be readily understood that the novel method used for supplying heat to the stabilizer by the conversion of the mechanical energy of the expanding gas into heat by the compression of gas is capable of operation at any practical temperature level. In the compressor cycle described the gas compressed by compressor 12 is heated according to the same law whereby the expanding gas is cooled. If no heat were abstracted from the system the temperature would continue to rise indefinitely since energy would be constantly delivered to the system with no withdrawal of energy from the system. Hence the temperature level of the compressed gas will seek that point at which its energy may be dissipated through the coil 29, the control cooler 34, the pump 25, and through incidental losses at the same rate at which energy is put into the system by the engine.

As already pointed out, in the operation of flush oil wells, losses occur at two points in the flow of the crude from the well to the flow tank. The gas separated from the crude at relatively high pressures in the separator contains recoverable gasoline and recovery may be made by the method described hereinbefore. The crude on being released to the flow tank at substantially atmospheric pressure suffers a further material loss in the gas which comes out of solution at the reduced pressure. This gas, usually rich in recoverable motor fuel, normally escapes to the atmosphere.

In accordance with an embodiment of this invention this loss is prevented by the stabilization of the crude in conjunction with the stabilization of the condensate recovered from the separator gas. The crude oil from the separator, and before release to the flow tank, is introduced into stabilizer 27 through connection 49, after being partially heated in heat exchanger 48 if desired. The crude oil in the separator is saturated with the components of the gas at the temperature and pressure existing therein. In flowing down through the stabilizer the crude has stripped therefrom the undesirable low boiling components in the same manner that the condensate is stripped, with which it is now mixed. The bottom of stabilizer 27 is maintained at such a temperature that the stabilized crude on flowing therefrom through exchanger 48 and cooler 38 to the flow tank has a vapor pressure less than the pressure of the atmosphere at the temperature at which it passes to the flow tank and on passing thereto suffers no appreciable loss. The crude in the flow tank thus contains substantially all of the motor fuel constituents associated with it in the well and these materials may be recovered by usual refining methods when the crude is subsequently processed in an oil refinery.

As has already been pointed out, in the liquefaction of the higher boiling components of the gas substantial quantities of the lower boiling components are also condensed. In accordance with the well-known principles of fractional condensation the composition of the condensate shows a greater proportion of higher boiling components to lower boiling components than does the original gas. Thus it is found that the concentration of butanes and propane as compared to that of ethane and methane is much greater in the condensate than in the original gas. When the excess butanes and the propane and lighter components of the condensate are stripped therefrom in the stabilizer and eliminated from the system as the stabilizer overhead product, this product therefore contains butanes and propane in a relatively concentrated form as compared with the original feed gas. Depending on the temperature and pressure at which the cooling and condensing of the feed gas are conducted a greater or less recovery of the total quantity of these components may be had. By proper selection of operating conditions the greater portion of the propane and butanes present may be separated from the main body of the gas and produced as concentrated product of considerable value as the raw materials from which very high grade motor fuel may be produced by modern methods of polymerization.

A practical consideration of considerable importance in connection with operation of the invention has to do with the common occurrence of water vapor in the feed gas. It is apparent that its presence, if not specifically guarded against, would cause serious difficulties at the low temperatures involved in the form of ice coating on the heat exchanger surface, accumulation of ice in pipes and elsewhere. A number of expedients may be used to overcome this difficulty. For example, the gas may be dehydrated by well known means before its introduction into the system, or those portions of the system subject to the accumulation of ice may be supplied in duplicate so that when one unit has become clogged or has lost its efficiency due to the accumulation of ice, it may be taken out of service to be thawed out and the duplicate unit may be put into service during this period. While these expedients are entirely practical the extra cost is burdensome and a simpler expedient, which forms a part of this invention, is preferred. In accordance with this phase of the invention a water soluble and oil insoluble solution of low freezing point is introduced into the feed gas stream at a point where the temperature thereof is higher than the freezing point of water, for example, through valved pipe 90. This solution then passes through the cooling system with the feed gas and as water vapor is condensed as the temperature falls it is taken up by the solution and thus carried to the condensate accumulator as liquid. At this point it may be removed from the system by decantation, for example, through valved pipe 91, and either discarded or the excess water may be removed therefrom and the solution reused. In a preferred application of these principles the solution is withdrawn from the accumulator and is supplied continuously to a vessel heated by hot gas from the compressor system whereby the water taken up is vaporized and the thus revivified solution is used again as described. Heat exchangers are used to cool the hot solution withdrawn from the evaporator by indirect heat exchange contact with the cold solution being supplied thereto. Numerous solutions are suitable for service as described and, by way of example only, an aqueous solution of calcium chloride is satisfactory where the minimum temperature of the feed gas stream is −40 degrees Fahrenheit or thereabouts.

Another feature of the invention which has to do with the practical operation thereof and which is of importance in the maintenance of high operating efficiency resides in the method of control whereby varying amounts of gas may be handled according to the varying production of feed gas at the well. Engines of the type preferred for this service operate at maximum efficiency and therefore give the maximum refrigerating effect when operating at wide open throttle with the valve cut-off adjusted to give the full expansion of the gas to the desired exhaust pressure from the full intake pressure. In accordance with this phase of the invention, these conditions are maintained for the engine and it is controlled to handle varying quantities of gas as supplied through controlling its speed by the indirect method of manipulating the throttling device 32 in the compressed gas circuit. As the pressure of the incoming feed gas tends to rise, indicating that the engine is not taking gas as rapidly as produced, throttle 32 is opened to permit more compressed gas to expand therethrough, thereby causing the engine to speed up to maintain the compressor load and permitting the engine to take more gas and balancing its consumption against the production of gas at the well. By this means the engine is allowed to run with wide open throttle at all times, resulting in maximum efficiency. Such control of throttle 32 may be manual or may be arranged for automatic operation by pressure in drum 5 by simple means familiar to one skilled in the art.

The following example of a specific case of the operation of this invention is submitted by way of example only and is not to be construed as defining or limiting the scope of the invention.

Gas from a separator is processed at a rate of approximately 10,000,000 cubic feet per day as measured at 60 degrees Fahrenheit and atmospheric pressure. The gas has an average molecular weight of about 22 and contains about 1.4 gallons per 1,000 cubic feet of "26 pound Reid" gasoline. It leaves the separator at about 100 degrees Fahrenheit and 80 pounds per square inch gauge pressure and enters pipe 1 under these conditions. In passing through heat exchangers 2, 3, and 4 to drum 5 it is cooled to a temperature of about −20 degrees Fahrenheit and the pressure, due to frictional resistance, has dropped to 75 pounds gauge. Approximately 7 mol percent or about 19 percent by weight has been condensed as a liquid of about 61 molecular weight. The dry gas from drum 5 at −20 degrees Fahrenheit passes through exchanger 3 wherein it is warmed to around 40 degrees Fahrenheit and wherein the feed gas is cooled from about 60 degrees Fahrenheit to about 25 degrees Fahrenheit. The warmed gas passes through pipes 8 and 9 to the intake of engine 10, reaching that point at a pressure of about 70 pounds gauge. In expanding through cylinder 11 of engine 10 an indicated horsepower of about 515 is developed, the gas exhausting therefrom at about 5 pounds gauge and a temperature of around −65 degrees Fahrenheit. The cold gas passes through pipe 14 to exchanger 4 wherein it imparts the final cooling to the feed gas, cooling it from around 25 degrees Fahrenheit to about −20 degrees Fahrenheit and in so doing being itself warmed to about 10 degrees Fahrenheit. The gas passes from exchanger 4 through pipes 15 and 17 to exchanger 2 wherein it cools the entering feed gas from around 100 degrees Fahrenheit to about 60 degrees Fahrenheit and is thereby warmed to about 80 degrees Fahrenheit, exhausting into pipes 17 and 18 at that temperature and at about atmospheric pressure. Pipe 18 conducts it to a safe distance from the plant at which point it is discharged to the air and burned.

Condensate from drum 5 is pumped through pipes 23 and 26 by pump 25 to the top of stabilizer 27. Stabilizer 27 consists of a vertical packed tower about 30 feet in height and about 18 inches in diameter operating at 80 pounds gauge pressure. The temperature at the bottom of the tower is maintained at about 210 degrees Fahrenheit by heating coil 29. Stabilized gasoline having a Reid vapor pressure of 26 pounds flows from the tower through water cooler 38 to storage at a rate of about 14,000 gallons per day. Gas from the top of the tower at a temperature of about 80 degrees Fahrenheit is released through pressure control valve 40. The gas has a molecular weight of about 42 and consists of about 70 mol percent propane and butanes whereas these components constituted less than 10 mol percent of the original feed gas.

The compressed gas circulating system receives energy from the engine at a rate of about 415 horsepower, the loss of 100 horsepower being dissipated in the mechanical losses of the engine and the compressor. The gas thus receives energy equivalent to about 1,000,000 B. t. u. per hour all of which except for the small amount used to operate pump 25 is transformed into sensible heat energy. The compressed gas from the compressor is at a temperature of about 510 degrees Fahrenheit and 80 pounds gauge pressure and is cooled in heater coil 29, control coil 34, and in expanding through throttle 32 and pump 25 to about 250 deg. F. at about atmospheric pressure. In the neighborhood of 70% of the heat is utilized by coil 29.

About 500 pounds per hour of calcium chloride brine having a freezing point of −40 degrees Fahrenheit is introduced, as through pipe 90, into the gas feed pipe 1, and this brine along with about 170 pounds of additional water which it has picked up from the gas is continuously withdrawn from the bottom of drum 5, as through pipe 91. The diluted brine is brought back to full strength in an evaporator heated by gas from the compressed gas system wherein the 170 pounds of water are removed therefrom and the restored brine is circulated continuously back to the feed gas after first passing through a heat exchanger wherein it is cooled to around 80 degrees Fahrenheit by heat exchange with cold diluted brine from drum 5 passing to the evaporator.

In this specific operation crude oil is not stabilized as a part of the process. In the event this is desired provision is made for doing so by the addition of heat exchanger 48 and the necessary pipes and connections 47 and 49. In order to produce a stable crude a temperature of about 250 degrees Fahrenheit is required. Most of the heat for carrying out this additional operation is recoverable from exchanger 48.

The scope of this invention is in no way limited to the conditions of the specific case as above set forth but is inclusive of all such methods of operation as fall within the meaning of the appended claims.

The operation of the invention has been described in connection with the recovery of liquefiable components from the natural gas associated with the production of crude petroleum. The invention can equally well be applied to the recovery of such material from natural gas from gas wells, and from the hydrocarbon gas encountered in the refining of petroleum such as still gas, gas produced in the cracking or polymerization of petroleum hydrocarbons, from gas produced in the distillation of coal, shale, or other bitumens, or from any gas containing such recoverable components.

I claim:

1. In the recovery of liquid hydrocarbons from a mixture of the vapors thereof with vapors of more volatile hydrocarbons, the steps comprising liquefying a portion of the mixed vapors, converting the pressure energy of an unliquefied portion of the vapors into heat, and absorbing the heat in the liquid formed in the liquefying step to stabilize the said liquid.

2. In the recovery of liquid hydrocarbons from a mixture of the vapors thereof with vapors of more volatile hydrocarbons, the steps comprising subjecting the mixed vapors to condensing treatment to form a condensate and a body of residual vapor, separating the condensate and residual vapor, converting the pressure energy of the residual vapor into heat, and absorbing the heat in the condensate to stabilize the said condensate.

3. In the recovery of liquid hydrocarbons from a mixture of the vapors thereof with vapors of more volatile hydrocarbons, the steps comprising subjecting the mixed vapors to condensing treatment to form a condensate and a body of residual vapor, separating the condensate and residual vapor, converting the pressure energy of the residual vapor into heat, passing the condensate to a stabilizing zone, and transmitting said heat to the condensate in said zone.

4. In the recovery of liquid hydrocarbons from a mixture of the vapors thereof with vapors of more volatile hydrocarbons, the steps comprising liquefying a portion of the vapors, expanding a portion of the vapors, converting into heat the work performed by said expansion, and absorbing said heat in the liquid formed by said liquefying step to stabilize the said liquid.

5. In the recovery of liquid hydrocarbons from a mixture of the vapors thereof with vapors of more volatile hydrocarbons, the steps comprising cooling the mixed vapors and thereby condensing a part thereof, separating the condensate from the uncondensed vapors, converting the pressure energy of the uncondensed vapors into heat, and absorbing said heat in said condensate to stabilize the latter.

6. In the recovery of liquid hydrocarbons from a mixture of the vapors thereof with vapors of more volatile hydrocarbons, the steps comprising expanding a portion of the more volatile vapors, and thereby reducing the temperature thereof, by the reduction of temperature derived from said expansion cooling and partially condensing the mixed vapors prior to said expansion, converting into heat the work performed by said expansion, and absorbing said heat in said condensate formed in said condensing step to stabilize the said condensate.

7. In the recovery of liquid hydrocarbons from a mixture of the vapors thereof with vapors of more volatile hydrocarbons, the steps comprising cooling the mixed vapors and thereby condensing a part thereof, separating the resulting condensate and residual vapors, expanding the residual vapors and thereby reducing the temperature thereof, utilizing said reduction of temperature to effect said cooling, converting into heat the work derived from said expansion, and absorbing said heat in said condensate to stabilize the latter.

8. In the recovery of liquid hydrocarbons from a mixture of the vapors thereof with vapors of more volatile hydrocarbons, the steps comprising cooling the mixed vapors and thereby condensing a part thereof, separating the resulting condensate and residual vapors, passing residual vapors to a zone of lower pressure and thereby expanding and reducing the temperature of said vapors while deriving work from said expansion, utilizing said reduction of temperature to effect the cooling of said first-mentioned step, passing said condensate to a stabilizing zone, and transmitting to the condensate in said zone as heat the work derived from said expansion.

9. In the recovery of liquid hydrocarbons from a mixture of the vapors thereof with vapors of more volatile hydrocarbons, the steps comprising cooling the mixed vapors and thereby condensing a part thereof, separating the resulting condensate and residual vapors, heating the residual vapors by heat exchange with the mixed vapors in said first-mentioned step, then expanding the uncondensed vapors and converting the pressure energy thereof into heat and thereby reducing the temperature thereof, utilizing said reduction of temperature in effecting the cooling in said first-mentioned step, and absorbing said heat in said condensate to stabilize the latter.

10. In the recovery of liquid hydrocarbons from a mixture of the vapors thereof with vapors of more volatile hydrocarbons, the steps comprising cooling the mixed vapors and thereby condensing a part thereof, separating the resulting condensate and residual vapors, converting the pressure energy of the residual vapors into heat, passing said condensate to a stabilizing zone, and transmitting said heat into said condensate in said stabilizing zone.

11. The method of recovering stable motor fuel from wet hydrocarbon gas which comprises expanding dry hydrocarbon gas from a higher pressure to a lower pressure to perform work and to cool said dry gas, passing said cooled expanded dry gas in indirect heat exchange relationship with wet hydrocarbon gas under substantial pressure to cool said wet gas and to liquefy higher boiling components thereof, passing said liquefied components to a stabilizing zone, converting said work into heat and delivering part of said heat to said stabilizing zone to stabilize said liquefied components to form stable motor fuel.

12. The method of recovering stable motor fuel from wet hydrocarbon gas which comprises passing wet hydrocarbon gas containing liquefiable constituents of the motor fuel boiling range under substantial pressure in indirect heat exchange relationship with cold gas from which said liquefiable constituents have been substantially removed to cool said wet hydrocarbon gas and to l'quefy said liquefiable constituents, separating said liquefied constituents from the unliquefied portion of said cooled gas, polytropically expanding said unliquefied portion of said cooled gas to perform work whereby said gas is cooled to still lower temperature, utilizing said cooled expanded gas as the cold gas in said first-mentioned indirect heat exchange step, passing said liquefied constituents to a stabilizing zone, converting said work into heat, and delivering part of said heat to said stabilizing zone to stabilize said liquefied constituents to form the desired stable motor fuel.

13. The method of recovering stable motor fuel from wet hydrocarbon gas which comprises passing wet hydrocarbon gas containing liquefiable constituents of the motor fuel boiling range under substantial pressure in indirect heat exchange relationship with cold hydrocarbon gas from which said liquefiable constituents have been substantially removed to cool said wet gas and to liquefy said liquefiable constituents, separating liquefied constituents from the unliquefied portion of said cooled wet gas, utilizing said unliquefied portion as cold gas in said first-mentioned indirect heat exchange to cool partially said wet gas, expanding said unliquefied portion polytropically to perform work and to cool said expanding gas to a lower temperature than that previously attained, utilizing said cooled expanded gas as cold gas in said first-mentioned indirect heat exchange to complete the cooling of the wet gas, passing said liquefied constituents to a stabilizing zone, converting said work into heat, and delivering part of said heat to said stabilizing zone to stabilize said liquefied constituents to form the desired stable motor fuel.

14. The method of recovering stable motor fuel from wet hydrocarbon gas which comprises passing wet hydrocarbon gas containing liquefiable constituents of the motor fuel boiling range under substantial pressure in indirect heat exchange relationship with cold hydrocarbon gas from which said liquefiable constituents have been substantially removed to cool said wet gas and to liquefy said liquefiable constituents, separating liquefied constituents from the unliquefied portion of said cooled wet gas, expanding said unliquefied portion of said gas polytropically in a plurality of expanding stages to perform work and to cool said gas, said cooling in at least one stage to be to a lower temperature than that attained by the wet gas, utilizing said expanded cooled gas subsequent to each expanding stage as cold gas in said indirect heat exchange, passing said liquefied constituents to a stabilizing zone, converting said work into heat, and delivering part of said heat to said stabilizing zone to stabilize said liquefied constituents to form the desired stable motor fuel.

15. In the method of recovering stable motor fuel from wet hydrocarbon gas the steps which comprise expanding dry natural gas polytropically to perform work and to cool said dry gas, passing said cooled expanded dry gas in indirect heat exchange relationship with wet natural gas under substantial pressure to cool said wet gas and to liquefy higher boiling constituents thereof, passing said liquefied constituents to a stabilizing zone, expending said work to compress gas whereby said gas is heated, passing part of said heated compressed gas in indirect heat exchange relationship with the liquid being stabilized in said stabilizing zone to transfer heat from said gas to said liquid, reducing the pressure on said compressed gas, and returning it to be compressed.

16. The method of separating wet hydrocarbon gas into a portion consisting predominantly of methane and ethane, a second portion consisting predominantly of propane and butanes, and a third portion consisting predominantly of pentanes and higher hydrocarbons which comprises passing wet hydrocarbon gas under substantial pressure in indirect heat exchange relationship with cold gas consisting predominantly of methane and ethane to cool said wet natural gas and to liquefy substantial portions of the propane and heavier constituents thereof to form a gaseous portion consisting of methane and ethane and a liquid portion consisting predominantly of hydrocarbons heavier than ethane, separating said gaseous and liquid portions, expanding said gaseous portion polytropically to perform work and to cool said gaseous portion, utilizing said expanded cooled gaseous portion as cold gas in said first-mentioned indirect heat exchange with said wet gas and withdrawing said gaseous portion as the desired portion consisting predominantly of methane and ethane, passing said liquid portion to a fractionating zone, converting said work into heat, and delivering part of said heat to the heating zone of said fractionating zone to fractionate said liquid portion into a gaseous portion comprising the desired portion consisting predominantly of propane and butanes and a residual liquid portion comprising the desired portion consisting predominantly of pentanes and heavier hydrocarbons.

17. The method of separating crude petroleum and its associated natural gas into gaseous portions substantially free of components of the motor fuel boiling range and a liquid portion substantially free of components of lower boiling range than that of motor fuel which comprises separating crude petroleum and its associated natural gas under substantial pressure into a gaseous portion consisting of wet natural gas and a liquid portion consisting of unstable crude petroleum, passing said wet natural gas in indirect heat exchange relationship with cold dry natural gas to cool said wet gas and to liquefy the higher boiling constituents thereof, separating said gaseous and liquid portions to form dry natural gas substantially free of components of the motor fuel boiling range and unstable condensate, expanding said dry gas polytropically to perform work and to cool said dry gas, utilizing said cold gas as dry gas in said first-mentioned indirect heat exchange, passing said unstable condensate to a stabilizing zone, passing said unstable crude petroleum to said stabilizing zone, converting said work into heat, delivering a portion of said heat to said stabilizing zone, and stabilizing said unstable condensate and unstable crude petroleum to form a second gaseous portion substantially free of components of the motor fuel boiling range and a stable liquid portion substantially free of components of lower boiling range than that of motor fuel.

18. The method of recovering stable motor fuel from wet hydrocarbon gas which comprises introducing wet hydrocarbon gas under substantial pressure into a fractionating zone, passing said wet gas countercurrently in contact with reflux condensate, cooling said wet gas in indirect heat exchange relationship with cold dry gas to liquefy constituents of said wet gas boiling within the motor fuel boiling range, said liquefied constituents forming said reflux condensate, withdrawing the unliquefied portion of said wet gas as dry gas, expanding polytropically said dry gas to perform work and to cool said gas, utilizing said cold expanded gas as dry gas in said first-mentioned indirect heat exchange, passing said reflux condensate to a stabilizing zone, converting said work into heat, and delivering a portion of said heat to said stabilizing zone to stabilize said reflux condensate to form the desired stable motor fuel.

19. In the method of recovering stable motor fuel, the steps which comprise introducing an aqueous hygroscopic solution having a low freezing point into a stream of wet gas under pressure which is being cooled and partially liquefied at a point where the temperature of said stream is above 32 degrees Fahrenheit, further cooling said wet gas and concurrently cooling said solution therewith to a temperature above that of the freezing point of said solution to liquefy a portion of said wet gas, converting the pressure energy of the uncondensed portion of said wet gas into heat, separating said solution from said gas and liquid portion, evaporating excess water from said solution by utilizing part of said heat and returning said solution to be introduced into said first-mentioned stream of gas.

20. In the recovery of liquid hydrocarbons from a mixture of vapors thereof with vapors of more volatile hydrocarbons, the steps comprising compressing a body of gas by the pressure energy of the more volatile vapors thereby heating the gas, and absorbing the heat from said gas in the recovered liquid hydrocarbons to stabilize the latter.

OSWALD C. BREWSTER.